United States Patent [19]
DePue

[11] Patent Number: 5,845,954
[45] Date of Patent: Dec. 8, 1998

[54] GLOVE BOX ASSEMBLY INCLUDING GLOVE BOX THAT IS POSITIONABLE IN A PARTIALLY OPEN POSITION

[75] Inventor: Todd L. DePue, Brighton, Mich.

[73] Assignee: Toyota Technical Center, U.S.A., Inc., Arm Arbor, Mich.

[21] Appl. No.: 669,936

[22] Filed: Jun. 25, 1996

[51] Int. Cl.$^6$ .................................................. B60N 3/12
[52] U.S. Cl. .......................... 296/37.12; 312/328; 16/82; 292/DIG. 4; 220/335
[58] Field of Search ............................ 296/37.12, 37.8, 296/37.9; 224/483, 282, 539, 542, 543, 544; 312/326, 327, 328, 329; 16/82, 374; 292/DIG. 4; 220/335

[56] References Cited

U.S. PATENT DOCUMENTS

| | | | |
|---|---|---|---|
| 3,639,943 | 2/1972 | Cadiou | ..................................... 16/82 X |
| 4,239,277 | 12/1980 | Oda . | |
| 4,596,416 | 6/1986 | Müller . | |
| 4,630,857 | 12/1986 | Zweiniger et al. . | |
| 4,790,146 | 12/1988 | Mun et al. | ........................... 312/328 X |
| 5,165,124 | 11/1992 | Li | ................................... 292/DIG. 4 X |
| 5,197,775 | 3/1993 | Reeber . | |
| 5,385,378 | 1/1995 | Hakamada et al. . | |

FOREIGN PATENT DOCUMENTS

| | | | |
|---|---|---|---|
| 938467 | 2/1956 | Germany | ......................... 292/DIG. 4 |
| 57-77063 | 5/1982 | Japan . | |
| 60-152551 | 10/1985 | Japan . | |
| 60-45920 | 10/1985 | Japan . | |
| 5-56602 | 7/1993 | Japan . | |
| 6-50970 | 7/1994 | Japan . | |

*Primary Examiner*—Joseph D. Pape
*Attorney, Agent, or Firm*—Burns, Doane, Swecker & Mathis, LLP

[57] ABSTRACT

A glove box assembly is designed to allow the glove box to be moved from a fully closed position to a partially open position and from the partially open position to either a fully open position or the fully closed position. The glove box assembly includes a pair of guide pin elements each positioned on one of the sides of the glove box for engaging guide track elements. The guide track elements are specifically configured to guide the guide pin elements during the opening movement of the glove box.

17 Claims, 3 Drawing Sheets

GLOVE BOX ASSEMBLY INCLUDING GLOVE BOX THAT IS POSITIONABLE IN A PARTIALLY OPEN POSITION

FIELD OF THE INVENTION

The present invention generally relates to a storage receptacle for use in vehicles and more particularly pertains to a glove box assembly mountable in a vehicle dashboard or instrument panel for storing items.

BACKGROUND OF THE INVENTION

A variety of different glove compartments or glove box structures have been proposed in the past for use in automotive vehicles to store various items. Examples of these glove box structures are disclosed in U.S. Pat. No. 5,385,378, U.S. Pat. No. 5,197,775, U.S. Pat. No. 4,630,857, U.S. Pat. No. 4,596,416, U.S. Pat. No. 4,239,277, and Published Utility Model Application No. 57-77063.

Glove box structures can be generally categorized as one of two different kinds. One type involves what is in essence a recess formed in the instrument panel or dashboard of the vehicle that is covered by a hinged lid. Access to the recess for purpose of storing items in the recess or retrieving items stored in the recess is achieved by opening the lid. The other type of glove box structure involves a separate glove box that is pivotally mounted in a hole in the dashboard or instrument panel of the vehicle. This latter type of glove compartment is accessible by pivoting the entire glove box outwardly into the vehicle interior so that the receptacle in the glove box is exposed.

Glove box structures of this latter type are advantageous to the extent they permit relatively easy access to the receptacle in the glove box by virtue of the fact that the glove box itself pivots inwardly towards the passenger compartment. However, known versions of this latter type of glove compartment also suffer from certain drawbacks.

In one respect, known glove box structures of this type are typically designed so that once the handle on the glove box is operated, the glove box opens inwardly into the passenger compartment to its full extent. This can be problematic from the standpoint of a passenger seated in front of the glove box who is likely to have his knees hit by the opening glove box. This is particularly inconvenient since it is oftentimes unnecessary that the glove box be opened to its full extent to permit access to the contents in the glove box. Thus, these known glove box structures cause needless difficulties and annoyance to the passenger in the front seat.

In light of the foregoing, a need exists for a glove box assembly which is adapted to permit relatively easy access to the contents in the glove box, but which nevertheless does not suffer from the drawbacks and disadvantages mentioned above.

SUMMARY OF THE INVENTION

In accordance with one aspect of the present invention, a glove box assembly that is adapted to be mounted in a dashboard of an automobile vehicle includes a housing having a pair of opposed side walls and a hollow interior, and a glove box provided with a receptacle for receiving items to be stored. The glove box is hingedly connected to the housing for pivoting movement from a fully open position in which the receptacle is accessible to a fully closed position in which the receptacle is inaccessible, from the fully closed position to at least one partially open position located between the fully open and fully closed positions, and from the at least one partially open position to the fully open position or to the fully closed position. A guide pin is mounted on each side wall of the glove box, and a guide track element is mounted on each side wall of the housing in opposing relation to the guide pin. The guide pins are rotatably mounted for rotational movement upon application of a force to the guide pin. Each guide track element includes a recessed portion in which is located a raised land so that a continuous guide track surrounds the land. Each of the guide pins is disposed in the guide track of one of the guide track elements to guide the movement of the glove box from the fully open position to the fully closed position, from the fully closed position to the at least one partially open position, and from the at least one partially open position to the fully open position.

According to another aspect of the present invention, a glove box assembly for being mounted in a dashboard of an automotive vehicle includes a housing and a glove box positioned within the hollow interior of the housing, with the glove box being pivotally mounted with respect to the housing for movement between a fully closed position, a partially open position and a fully open position. A guide track element is mounted on each of the opposed side walls of the housing and each of the guide track elements includes a guide track. A guide pin is mounted for rotational movement on each of the sides of the glove box, with each guide pin being positioned in a respective one of the guide tracks for movement within the guide track of the respective guide track element during movement of the glove box between the fully closed position, the partially open position and the fully open position to control the movement of the glove box. Each guide track includes a fully closed stop position engaged by the respective guide pin when the glove box is in the fully closed position, an intermediate stop position engaged by the respective guide pin when the glove box is in the partially open position to maintain the glove box in the partially open position, and a fully open stop position engaged by the respective guide pin when the glove box is in the fully open position to maintain the glove box in the fully open position.

In accordance with another aspect of the present invention, a glove box assembly adapted to be mounted in a dashboard panel of a vehicle includes a glove box provided with a receptacle for receiving items to be stored. The glove box is provided with an arrangement for pivotally mounting the glove box with respect to the dashboard panel for pivotable movement in an opening direction between a fully closed position in which the receptacle is inaccessible, a partially open position in which the receptacle is accessible and a fully open position in which the receptacle is accessible. The assembly also includes features for maintaining the glove box at the partially open position between the fully closed position and the fully open position, and for permitting the glove box to be pivoted from the partially open position to the fully open position by pushing the glove box in a direction opposite the opening direction.

BRIEF DESCRIPTION OF THE DRAWING FIGURES

The foregoing and additional features of the present invention will become more apparent from the detailed description set forth below considered in connection with the accompanying drawing figures in which like reference numerals designate like elements and wherein.

DETAILED DESCRIPTION OF THE INVENTION

In general, the glove box assembly according to the present invention is designed to permit the glove box to be moved between a fully closed position and a fully open position, with the glove box being adapted to be maintained at a partially open position intermediate the fully closed position and the fully open position. The glove box is also adapted to be moved from the partially open position to the fully open position and from the fully open position to the fully closed position through a push-push operation of the glove box.

Figure 1:
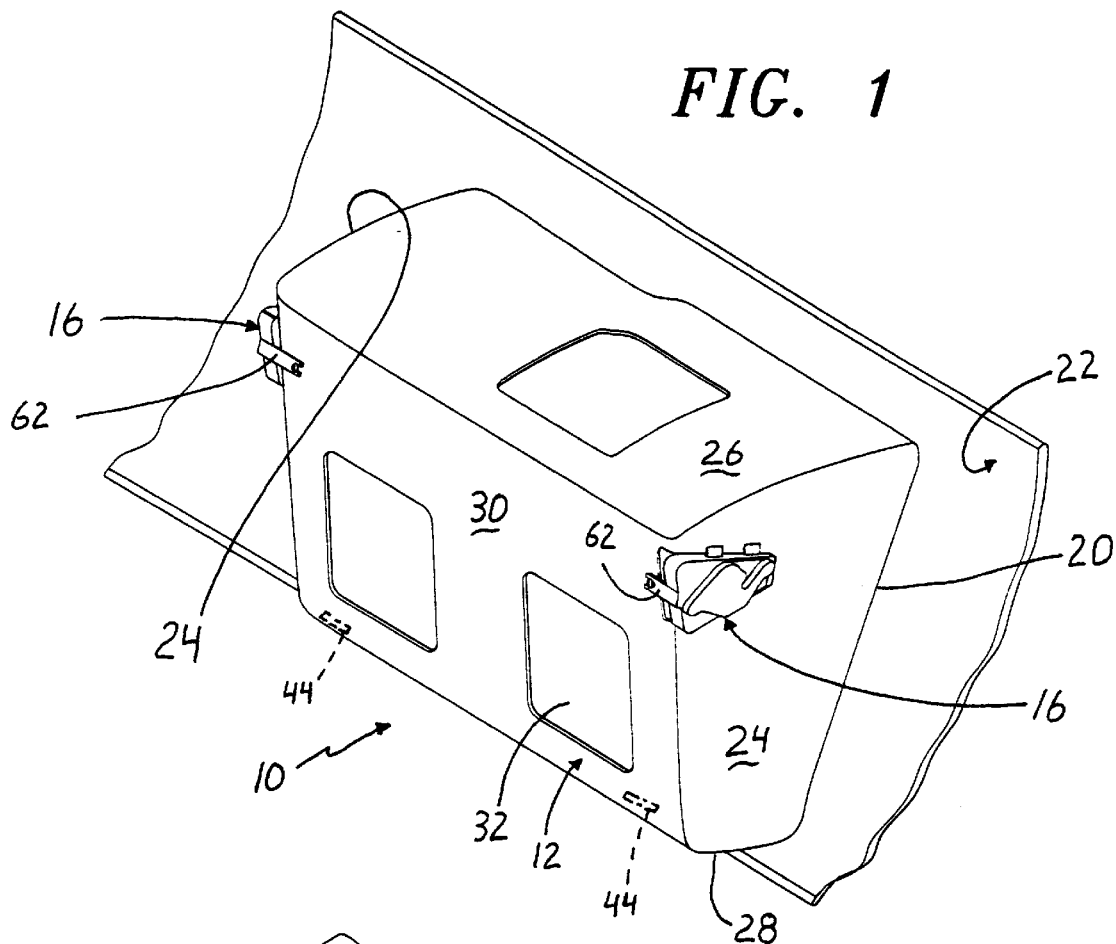
FIG. 1 is a rear perspective view of the glove box assembly according to the present invention mounted on the dashboard or instrument panel of an automotive vehicle.
Figure 2:
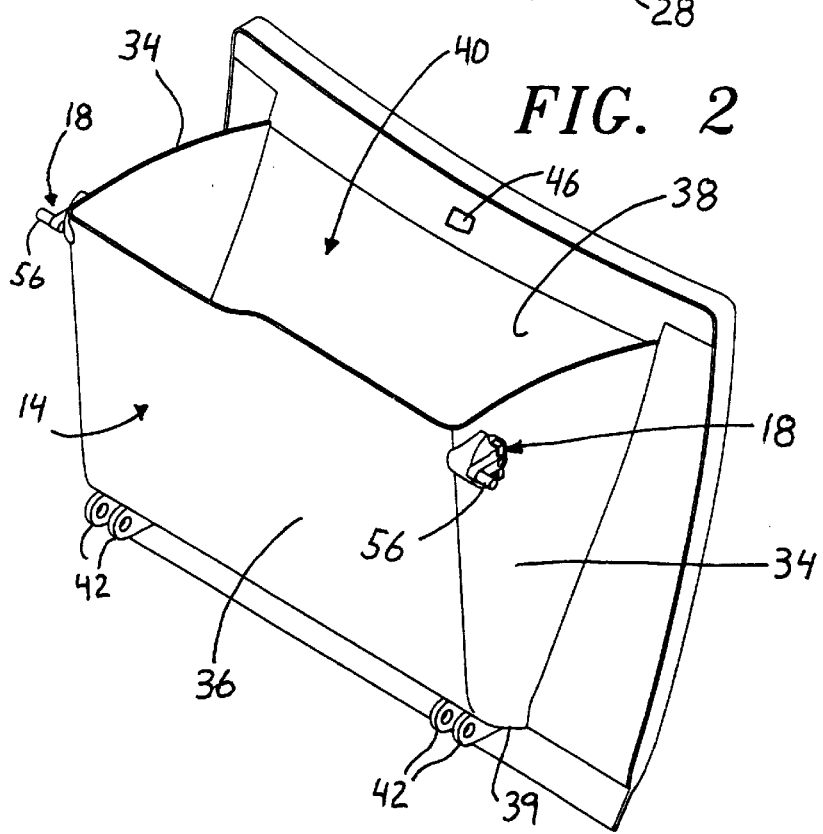
FIG. 2 is a rear perspective view of the glove box portion of the glove box assembly shown in FIG. 1.

The details associated with the glove box assembly of the present invention can be more easily appreciated with initial reference to FIGS. 1 and 2. The glove box assembly 10 consists of four main parts that include a housing 12, a glove box 14, a pair of guide track elements 16, and a pair of guide pin elements 18.

As seen in FIG. 1, the housing 12 is adapted to be mounted in an opening 20 provided in a dashboard or instrument panel 22 of an automotive vehicle. The housing 12 is provided with a pair of oppositely positioned side walls 24, a pair of oppositely positioned top and bottom walls 26, 28, and a rear wall 30. The side walls 24, the top wall 26, the bottom wall 28 and the rear wall 30 together define the enclosing structure for the hollow interior 32 of the housing 12. The front portion of the housing 12 disposed opposite the rear wall 30 is open to receive the glove box 14. The housing 12 can be secured in place in the opening 20 in the dashboard or instrument panel 22 in any suitable manner.

Received within the hollow interior 32 of the housing 12 is the glove box 14 illustrated in FIG. 2. The glove box 14 is generally defined by a pair of opposed side walls 34, a rear wall 36, a front wall 38, and a bottom wall 39. The glove box 14 is also provided with an open top that permits access to a storage receptacle 40 for storing items. The storage receptacle 40 is bounded by the side walls 34, the rear wall 36 and the front wall 38.

The lower portion of the glove box 14 is provided with a plurality of apertured flanges 42 for allowing the glove box 14 to be pivotally connected to the housing 12. In this way, the glove box 14 is able to pivot into and out of the hollow interior 32 of the housing 12. FIG. 1 generally depicts the axially aligned hinge pins 44 that pass through the apertured flanges 42 on the glove box 14 as well as apertured lugs (not specifically shown) provided on the lower portion of the housing 12. This mounting structure allows the glove box 14 to pivot about the axis of the hinge pins 44.

Positioned at the top of the glove box 14 is a handle 46 that is only schematically depicted in FIG. 2 for purposes of illustration only. The specific structure of the handle 46 and the way in which the handle 46 engages a latch on the housing 12 to form a latch mechanism is known in the art and so will not be described in detail here. Suffice it to say that the latch mechanism maintains the glove box in the fully closed position and that operation of the handle 46 releases the latch mechanism so that the glove box 14 is able to pivot in the opening direction from the fully closed position.

Figure 3:
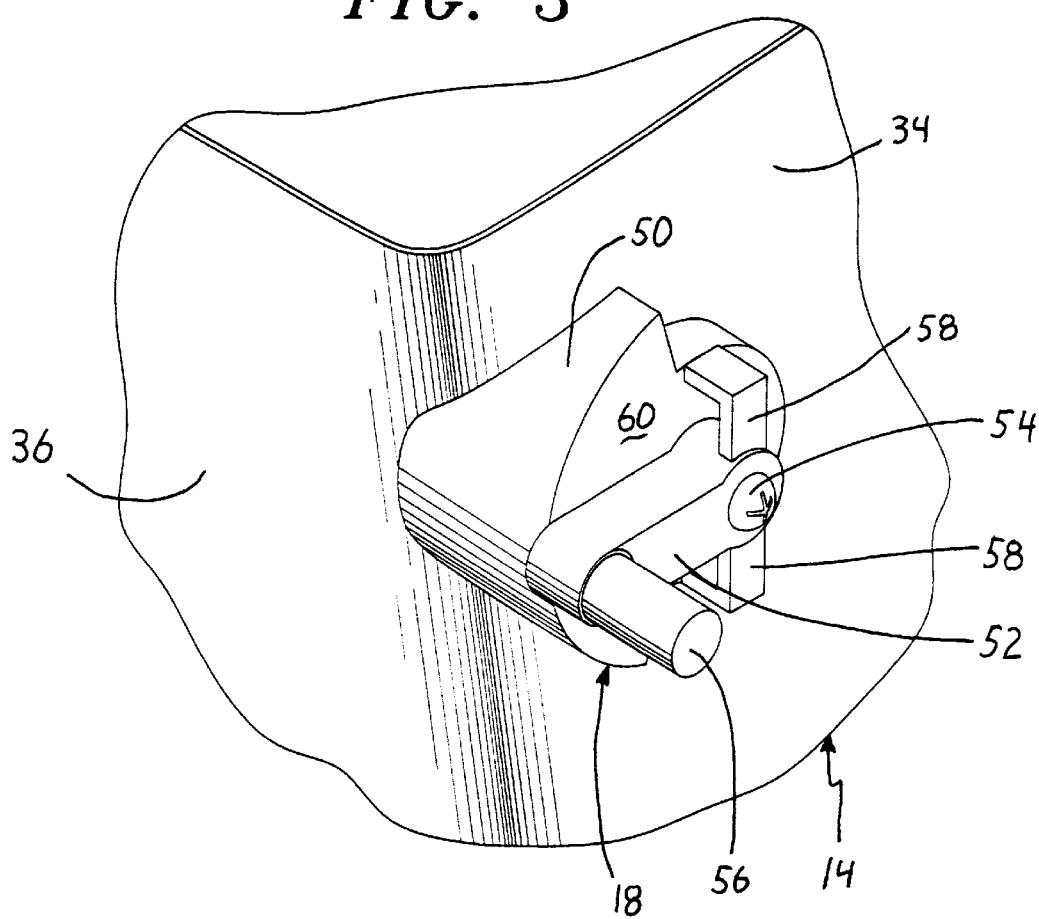
FIG. 3 is an enlarged perspective view of a portion of the glove box shown in FIG. 2 illustrating the guide pin element.

As seen with further reference to FIG. 2, the guide pin elements 18 are mounted on the opposed side walls 34 of the glove box 14. FIG. 3 illustrates an enlarged view of a portion of the glove box 14 and depicts various details associated with one of the guide pin elements 18. It is to be understood that the two guide pin elements 18 are identical in structure, function and operation and so the details associated with only one of the guide pin elements 18 will be described below.

Each guide pin element 18 consists of a base portion 50 that rests against the side wall 34 of the glove box 14 and curves partially around the corner adjoining the side wall 34 and the rear wall 36. Mounted on the base portion 50 is a lever 52 that is held on the base portion 50 by a screw 54. The screw 54 can also extend through a hole (not shown) in the side wall 34 to serve as a mechanism for securing the guide pin element 18 to the side wall 34.

Extending generally perpendicularly from the lever 52 is a guide pin 56. In addition, a pair of L-shaped arms 58 extend from the lever 52 and are preferably integrally formed in one piece with the lever 52. The L-shaped arms 58 are adapted to frictionally engage the upper surface 60 of the base member 50 in order to frictionally retain the lever 52 and the guide pin 56 in position while at the same time allowing the lever 52 and the attached guide pin 56 to be rotated upon the application of a force to the guide pin 56. The frictional force between the arms 58 and the upper surface 60 of the base member 50 can be controlled by tightening or loosening the screw 54. Thus, the guide pin 56 and the lever 52 are adapted to be rotated around the axis of the screw 54 when a force is applied to the guide pin 56. Once the force applied to the guide pin 56 is removed, the lever 52 and the associated guide pin 56 are retained in position through the frictional engagement between the L-shaped arms 58 and the upper surface 60 of the base member 50.

As an alternative to the above-described construction in which the frictional force between the arms 58 and the upper surface 60 of the base member 50 can be controlled by tightening or loosening the screw 54, it is possible to design the guide pin element 18 with no friction adjustability. That is, the guide pin element 18 can be designed so that once the screw 54 is tightened in place, the frictional engagement between the L-shaped arms 58 and the upper surface 60 of the base member 50 does not significantly change. This can be done by, for example, providing the lever 52 with a hole that receives a boss extending from the base member 50. In this way, once the screw 54 is tightened so that no more movement of the lever 52 with respect to the boss is possible, the arms 58 will be engaged with the upper surface 60 of the base member 50 to the desired degree to provide the desired amount of frictional engagement.

With reference once again to FIG. 1, the pair of guide track elements 16 are adapted to be mounted on the opposed side walls 24 of the housing 12. Each of the side walls 24 of the housing 12 is provided with a hole in which is situated one of the guide track elements 16. Since the structure associated with both of the guide track elements 16 is the same, the following description relating to one of the guide track element 18 is to be understood to apply to both guide track elements 16.

The guide track element 16 is secured in position on the side wall 24 in two different ways. First, the guide track element 16 is provided with a mounting arm 62 having a free end that is notched to receive a screw that secures the mounting arm 62 to the rear wall 30 of the housing 12. The other mechanism for mounting the guide track element 16 on the side wall 24 of the housing 12 is seen with reference to the detailed view of the guide track element shown in FIG. 4. The opposite sides of the guide track element 16 are provided with a plurality of mounting tabs 64. The mounting tabs 64 are staggered so as to be positioned on either side of a central plane. Thus, when the guide track element 16 is mounted on the side wall 24 of the housing 12, several of the mounting tabs 64 are positioned on the inner surface of the side wall 24 and the remaining mounting tabs 64 are positioned on the outer surface of the side wall 24. In this way, the side wall 24 is straddled by the mounting tabs 64 so that the guide track element 16 is retained in place on the side wall 24.

Figure 4:
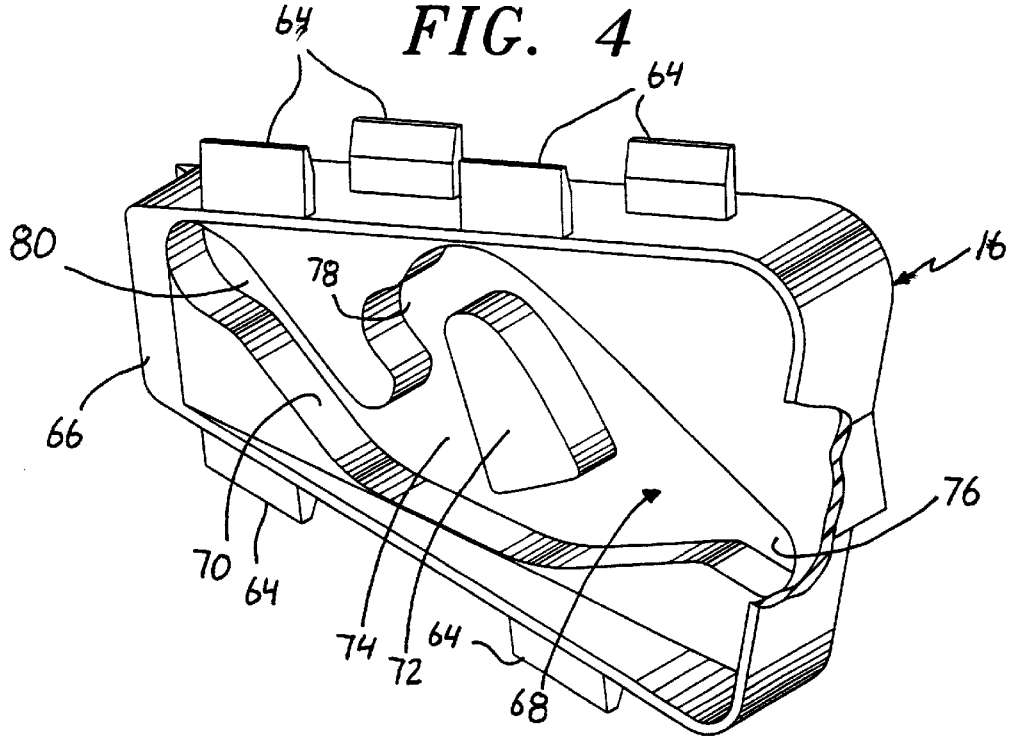
FIG. 4 is an enlarged perspective view of the guide track element that is mounted on the housing portion of the glove box assembly.

As further seen with reference to FIG. 4, the guide track element 16 is defined by a generally rectangular body 66 that is provided with a particularly configured recessed area 68 surrounded by area by an upstanding peripheral wall 70. Positioned at a somewhat central position within the recessed area 68 is a raised land 72. As will be described below in more detail, the land 72 functions as a mechanism for diverting or rotating the guide pin 56 on the guide pin element 18 to effect the desired opening operation of the glove box 14.

The recessed area 68 in the body 66 defines what is in affect a guide track for the guide pin. As generally illustrated in FIG. 1, the guide track elements 16 are mounted on the opposed side walls 24 of the housing 12 so that the recessed region 68 of each guide track element 16 faces inwardly towards the hollow interior 32 of the housing 12. In addition, the guide pin elements 18 that are mounted on the opposite side walls 34 of the glove box 14 are mounted in opposing relation to the guide track elements 16 so that the guide pin 56 on each guide pin element 18 engages the guide track defined of the facing guide track element 16.

Referring once again to FIG. 4, the guide track defined by the recessed portion 68 essentially includes a continuous annular guide track portion 74 that encircles the raised land 72. In addition, the guide track includes three generally linear guide track extensions 76, 78, 80 extending outwardly from the generally centrally arranged guide track portion 74. A first one of the guide track extension portions 76 defines t fully closed stop position that is engaged by the guide pin 56 when the glove box 14 is in the fully closed position. A second one of the guide track extensions 78 defines an intermediate stop position that is engaged by the guide pin 56 when the glove box 14 is in an intermediate or partially open position. This second guide track extension 78 is designed to maintain the glove box 14 in the partially open position and prevent the glove box from being opened to the fully opened position until such time as the glove box 14 is pushed inwardly in the direction opposite to the opening direction. The third guide track extension 80 defines a fully open stop position that is engaged by the guide pin 56 when the glove box 14 is in the fully open position.

As can be seen from FIG. 4, the first guide track extension 76 is disposed generally opposite to the other two guide track extensions 78, 80. In addition, the third guide track extension 80 defining the fully open stop position is longer than the other two guide track extensions 76,78 while the second guide track extension 78 defining the intermediate stop position for the guide pin 56 is shorter than both of the other guide track extensions 76, 80.

Figure 5:
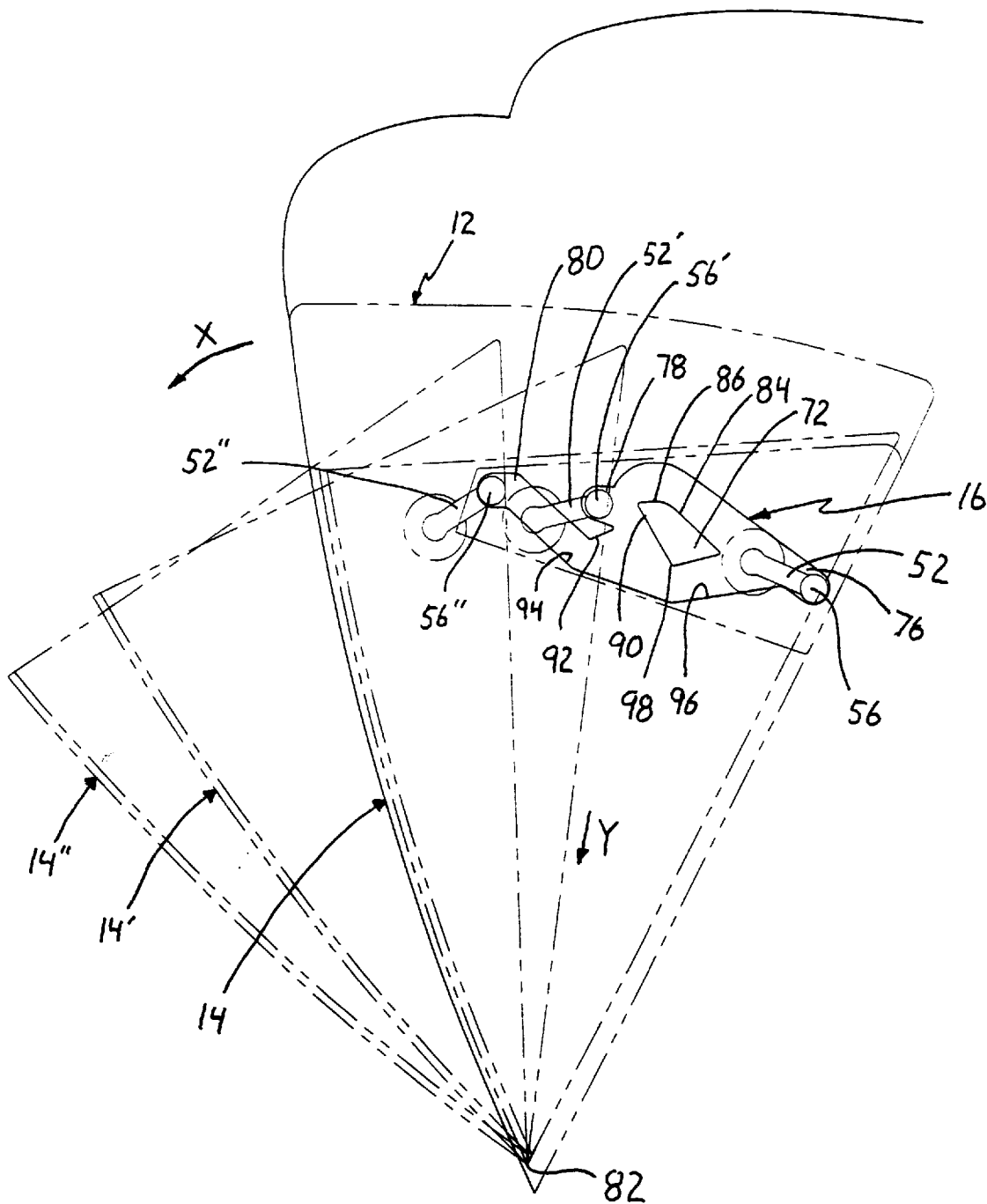
FIG. 5 is a side view of the glove box assembly of the present invention illustrating the glove box in the fully closed position, the intermediate or partially open position, and the fully open position.

Having described the details associated with the glove box assembly of the present invention, the operation of the glove box assembly will now be explained with reference to FIG. 5. The illustration in FIG. 5 shows three different positions for the glove box, namely a fully closed position, an intermediate or partially open position, and a fully open position. The position of the glove box 14 and the location and orientation of the guide pin 56 and the lever 52 at the time when the glove box is in the fully opened position are represented with double prime (") designations. The position of the glove box 14 and the location and orientation of the guide pin 56 and the lever 52 when the glove box 14 is in the intermediate position are represented by a single prime (') designation. Finally, the position of the glove box 14 and the position and orientation of the guide pin 56 and the lever arm 52 when the glove box 14 is in the fully closed position are identified with no prime designations. In addition, the operation of the glove box assembly according to the present invention is described below in the context of describing how one of the guide pin elements 18 interacts with the respective guide track element 16. It is to be understood that a similar operation applies to the guide pin element and guide track element on the opposite side of the glove box assembly. As seen in FIG. 5, the glove box 14 is adapted to be pivoted about a pivot axis 82 represented by the axis of the pivot pins 44 shown in FIG. 1. When the glove box 14 is in the fully closed position, the guide pin 56 associated with the guide pin element 18 is located in the first guide track extension portion 76 of the guide track element 16. The guide pin 56 is maintained in that position as a result of the engagement of the latching mechanism associated with the handle on the glove box and the latch on the housing 12. As is known, the glove box is mounted in such a way that once the latching mechanism is released through operation of the handle on the glove box 14, the glove box 14 immediately moves in the opening direction X due to the force of gravity. That is, the glove box is mounted relative to the housing to ensure that once the handle is operated, the glove box 14 automatically moves in the opening direction X into the vehicle interior.

As the glove box 14 moves in the opening direction X, the guide pin 56 initially contacts the side wall 84 of the raised land 72. This causes the guide pin 56 and the lever 52 to rotate (in the counter-clockwise direction with respect to the illustrated orientation shown in FIG. 5). As the glove box 14' continues moving in the opening direction X, the guide pin 56 continues to move along the side 84 of the raised land 72 so that the guide pin 56 and the lever 52 continue to rotate. Once the guide pin 56 reaches the rounded tip portion 86 of the raised land 72 the guide pin 56 and the lever 52 cease rotation and are maintained in such position as a result of the frictional engagement of the L-shaped arms 58 on the upper surface 60 of the base member 50 (see FIG. 3).

As the glove box 14 continues moving in the opening direction X, the guide pin 56 eventually contacts the curved portion 88 of the upstanding peripheral wall that surrounds the guide track. The continued movement of the glove box 14 in the opening direction X causes the guide pin 56 to move along the curved portion 86 of the upstanding peripheral wall, thereby forcing the lever 52 and the guide pin 56 to rotate (in the clockwise direction with reference to the orientation in FIG. 5). The curved portion 86 of the upstanding peripheral wall ultimately leads the guide pin 56 into the second guide track extension 78. At this point, the guide box 14' is disposed in the intermediate or partially open position. With the glove box 14' in the intermediate position, the engagement of the guide pin 56 in the second guide track extension 78 maintains the glove box 14' in the partially open position and prevents the glove box 14' from being opened any further until such time as a pushing force directed opposite the opening direction X is applied to the glove box 14. Thus, pulling on the glove box 14' in the opening direction X will not result in any further opening movement of the glove box 14'.

To move the glove box 14' from the intermediate or partially open position to the fully open position, the glove box 14' is pushed inwardly in a direction opposite the opening direction X. This causes the guide pin 56 to engage the angled side surface 90 on the raised land 72 so that the guide pin 56' and the lever 52' once again rotate (in the clockwise direction with reference to the orientation shown in FIG. 5).

The glove box 14' is pushed inwardly to the extent necessary to cause the guide pin 56' to move far enough in the Y direction that when the glove box 14' is released from being pushed inwardly, the guide pin 56' is able to move into the third guide track extension 80.

Once the glove box 14' has been pushed far enough inwardly and then released, the position of the guide pin 56' and the lever 52' will be fixed as a result of the frictional engagement of the L-shaped arms 58 with the upper surface 60 of the base member 50 on the guide pin element. Depending upon how far inwardly the glove box 14' is pushed in the direction opposite the opening direction X, the guide pin 56' will contact either the portion 92 of the peripheral wall located between the second and third guide track extensions 78, 80 or the portion 94 of the peripheral wall leading into the third guide track extension 80. In either case, the continued opening movement of the glove box 14' in the opening direction X will cause the guide pin 56' and the lever 52' to rotate as the guide pin 56' is lead into and along the third guide track extension 80. When the guide pin 56' reaches the end of the third guide track extension 80, the glove box 14" will have reached the fully opened position with the guide pin 56" and the lever 52" being oriented in the manner shown in FIG. 5. In this position, the glove box 14" is prevented from opening any further.

To close the glove box 14" from the fully open position shown in FIG. 5, the glove box 14" is pushed in the direction opposite the opening direction X. This causes the guide pin 56" and the lever 52" to be pivoted under the guiding action of the third guide track extension 80. Eventually, the guide pin 52" leaves the third guide track extension 80 where it subsequently contacts the portion 96 of the peripheral wall leading into the first guide track extension 76. This once again causes the guide pin 56" and the lever 52" to rotate until the latching mechanism between the glove box and the housing is engaged. Once the latching mechanism is engaged, the glove box 14 will once again be in the fully closed position shown in FIG. 5 in which the guide pin 56 is disposed in the first guide track extension 76.

The glove box 14' can also be moved from the intermediate position to the fully closed position by simply pushing the glove box 14' in the direction opposite the opening direction X until the latching mechanism between the glove box 14" and the housing 12 is engaged. As the glove box 14' moves from the intermediate position to the fully closed position, the guide pin 56' contacts the angled wall 90 of the raised land 72 to cause the guide pin 56' and the lever 52' to rotate (in the clockwise direction with reference to the orientation shown in FIG. 5). Once the guide pin 56' clears the corner 98 of the raised land 72, the rotation of the guide pin 56' and the lever 52' will cease until the guide pin 56' thereafter contacts the portion 96 of the peripheral wall. Thereafter, continued closing movement of the glove box 14' in the direction opposite the opening direction X will cause the guide pin 56' to move along the portion 96 of the peripheral wall so that the guide pin 56' and the lever 52' rotate (in the counter-clockwise direction with reference to the orientation shown in FIG. 5). Eventually, the guide pin 56' moves into the first guide track extension 76 and the latching mechanism between the glove box and the housing is engaged. At this point, the glove box 14 will once again be in the fully closed position shown in FIG. 5.

The glove box assembly according to the present invention is designed so that when the glove box is opened from the fully closed position, the glove box is first stopped at the intermediate or partially open position. That is, the glove box cannot be opened to the fully open position directly from the fully closed position.

As can be seen from FIG. 5, the guide pin 56 and the lever 52 are disposed at one angular orientation when the glove box 14 is located at the fully closed position.

As the glove box moves towards and reaches the partially open position, the guide pin and the lever are disposed at a different angular orientation. Further, as the glove box moves towards and reaches the fully open position, the guide pin and the lever are disposed at a still further different angular orientation.

The maximum angle that the glove box 14 traverses between the fully closed position and the fully open position is preferably no greater than 45°. More specifically, the glove box can be designed to move through an angle of 18°–30°, preferably about 23°, as the glove box moves from the fully closed position to the intermediate or partially open position. In addition, the glove box can be designed to move through or traverse an additional angle of 7°–22°, preferably about 12°, from the intermediate or partially open position to the fully open position. Thus, the glove box can be designed to move through an angle of 25°–45°, preferably approximately 35°, between the fully closed position and the fully open position. In addition, the glove box assembly can be designed to provide an approximate opening clearance or gap of 65mm –118 mm, preferably 100 mm, when the glove box 14' is in the intermediate or partially open position and a clearance or gap of 135 mm –200 mm, preferably approximately 150 mm, when the glove box 14" is in the fully open position.

As can be seen from the foregoing, the glove box assembly according to the present invention provides a glove box that not only can be positioned in a fully open position, but which can also be positioned in and maintained at a partially open position. This is quite advantageous from the standpoint of preventing the glove box from hitting the knees of a passenger seated in front of the glove box. That is, the glove box can be accessed without fully opening the glove box. Thus, the glove box assembly of the present invention is not susceptible of the same types of problems associated with other known glove box structures. The glove box assembly according to the present invention allows the glove box to be opened to a partial extent while driving and this permits the glove box to be used in various utilitarian contexts such as if a car phone or facsimile machine is located in the glove box. That is, the present invention allows the glove box to be used in the foregoing manner without the need for completely opening the glove box in a manner that is likely to be an annoyance to a passenger in the front seat.

The glove box assembly of the present invention is also advantageous from the standpoint of being rather simple in design and relatively easy to construct and utilize.

The push-push action that is necessary to move the glove box from the partially open position to the fully open position and from the fully open position to the fully closed position is rather easy to perform.

Although the preferred embodiment of the present invention described above is designed to provide a single intermediate or partially open position for the globe box, it is to be understood that the glove box assembly could also be designed to provide more than one intermediate or partially open position for the glove box. That is, by suitably designing the guide track element, the glove box can be designed to move through a plurality of different intermediate or partially open positions in which the glove box is open to differing degrees.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. Glove box assembly mountable in a dashboard of an automobile vehicle, comprising:
   a housing having a pair of opposed side walls and a hollow interior;
   a glove box provided with a receptacle for receiving items to be stored and hingedly connected to the housing for pivoting movement from a fully open position in which the receptacle is accessible to a fully closed position in which the receptacle is inaccessible, from the fully closed position to at least one partially open position located between the fully open and fully closed positions, and from the at least one partially open position to the fully open position, said glove box including opposed side walls that bound the receptacle;
   a pair of guide pins each mounted on one of the side walls of the glove box, each of the guide pins being rotatably mounted for rotational movement upon application of a force to the guide pin; and
   a pair of guide track elements each mounted on one of the side walls of the housing, each guide track element including a recessed portion in which is located a raised land so that a continuous guide track surrounds the land, each guide pin being disposed in the guide track of one of the guide track elements to guide movement of the glove box from the fully open position to the fully closed position, from the fully closed position to the at least one partially open position, and from the at least one partially open position to the fully open position.

2. Glove box assembly according to claim 1, wherein each guide pin is frictionally mounted on a base so that the guide pin is rotatable from one position to another position upon application of a force to the guide pin and is frictionally retained in place upon removal of the force.

3. Glove box assembly according to claim 1, wherein the recessed portion of each guide track element includes a first extension portion located on one side of the recessed portion and second and third extension portions located on an opposite side of the recessed portion, the first extension portion defining a fully closed stop position which is engaged by one of the guide pins when the glove box is in the fully closed position, the second extension portion defining an intermediate stop position which is engaged by one of the guide pins when the glove box is in the intermediate position, and the third extension portion defining a fully open stop position which is engaged by one of the guide pins when the glove box is in the fully open position.

4. Glove box assembly according to claim 1, wherein each of said guide pins is positioned on a respective lever, each lever being rotatable upon contact of the guide pin with side walls of the guide track and side walls of the land.

5. Glove box assembly for being mounted in a dashboard of an automotive vehicle, comprising:
   a housing having a plurality of walls bounding a hollow interior, said plurality of walls including a pair of opposed side walls;
   a glove box positioned within the hollow interior of the housing, said glove box being pivotally mounted with respect to the housing for movement between a fully closed position, a partially open position and a fully open position, said glove box being provided with a receptacle for receiving items to be stored;
   a pair of guide track elements each mounted on one of the opposed side walls of the housing, each guide track element including a land and a guide track, said guide track being recessed with respect to the land and surrounding the land; and
   a pair of guide pins mounted for rotational movement on the opposed sides of the glove box, each guide pin being positioned in a respective one of the guide tracks for movement within the guide track of the respective guide track element during movement of the glove box between the fully closed position, the partially open position and the fully open position to control movement of the glove box, each guide track including a fully closed stop position engaged by the respective guide pin when the glove box is in the fully closed position, an intermediate stop position engaged by the respective guide pin when the glove box is in the partially open position to maintain the glove box in the partially open position, and a fully open stop position engaged by the respective guide pin when the glove box is in the fully open position to maintain the glove box in the fully open position.

6. Glove box assembly according to claim 5, wherein each guide pin is mounted on a lever, and including means for causing each lever and guide pin to move from a first angular orientation to a second angular orientation different from said first angular orientation when said glove box is moved from said fully closed position to said partially open position.

7. Glove box assembly according to claim 6, including means for causing each lever and guide pin to move from said second angular orientation to a third angular orientation different from said first and second angular orientations when said glove box is moved from said partially open position to said fully open position.

8. Glove box assembly according to claim 6, wherein each guide track element includes a recessed area in which is disposed a raised land that is surrounded by the guide track, said means for causing each lever and guide pin to move from the first angular orientation to the second angular orientation including one side of the raised land, and said means for causing each lever and guide pin to move from said second angular orientation to said third angular orientation includes a different side of the raised land.

9. Glove box assembly according to claim 5, wherein each guide pin is connected to a lever that is rotatably mounted on a base.

10. Glove box assembly according to claim 5, wherein each guide pin forms a part of a guide pin element, each guide pin element including a base and a lever rotatably mounted on the base, each lever having one of the guide pins extending therefrom, the lever of each guide pin element being frictionally engaged with the base by at least one arm extending from the lever to permit the lever and the guide pin to rotate from one position to another position upon application of a force to the guide pin and to frictionally retain the lever and the guide pin in place upon removal of the force.

11. Glove box assembly according to claim 5, wherein each of said guide pins is positioned on a respective lever, each lever being rotatable upon contact of the guide pin with side walls of the guide track and side walls of the land.

12. Glove box assembly for being mounted in a dashboard panel of a vehicle, comprising:

a glove box provided with a receptacle for receiving items to be stored, said glove box including means for pivotally mounting the glove box relative to the dashboard panel for pivotable movement in an opening direction between a fully closed position in which the receptacle is inaccessible, a partially open position in which the receptacle is accessible and a fully open position in which the receptacle is accessible;

a pair of guide pins each mounted on the glove box, each of the guide pins being carried on a lever which is rotatable mounted on the glove box for rotating during movement of the glove box between the fully closed position, the partially open position and the fully open position:

a pair of guide track elements each mounted in opposition to one of the guide pins, each guide track element including a recessed portion in which is located a raised land so that a continuous guide track surrounds the land, each guide pin being disposed in the guide track of one of the guide track elements to guide movement of the glove box from the fully open position to the fully closed position, from the fully closed position to the at least one partially open position, and from the at least one partially open position to the fully open position, each guide track element including means for permitting the glove box to move from the partially open position to the fully open position by pushing the glove box in a direction opposite the opening direction and for permitting the glove box to move from the partially open position to the fully closed position without moving to the fully open position by pushing the glove box in a direction opposite the opening direction.

13. Glove box assembly according to claim 12, wherein said means includes said raised land of each guide track element being provided with an angled wall positioned to cause the guide pin to rotate and move to a position which allows the guide pin to move around the raised land when the glove box is pushed in the direction opposite said opening direction to move the glove box to the fully closed position.

14. Glove box assembly according to claim 12, wherein said raised land is located so that as said glove box moves from the partially open position to the fully open position the guide pin contacts the raised land.

15. Glove box assembly according to claim 12, wherein said guide pin is rotatably and frictionally mounted on a base so as to be rotatable from one position to another position upon application of a force to the guide pin and so as to be frictionally retained in place upon removal of the force.

16. Glove box assembly according to claim 12, including a housing having a hollow interior in which is positioned said glove box, each guide track element being mounted in opposition to the guide pin on the housing.

17. Glove box assembly according to claim 12, wherein each lever is rotatable upon contact of the guide pin with side walls of the guide track and side walls of the land.

\* \* \* \* \*